United States Patent Office 3,794,702
Patented Feb. 26, 1974

3,794,702
PROCESS FOR THE PRODUCTION OF O,O-DI-METHYL-O-1,2 - DIBROMO - 2,2-DICHLORO-ETHYLPHOSPHATE
Kennosuke Imamura, Tokyo, Shukichi Nabekawa, Funabashi, Itaru Otsubo, Tokyo, and Hisashi Kasuya, Ohmiya, Japan, assignors to Nippon Chemical Industrial Co., Ltd., Tokyo, Japan
No Drawing. Continuation of application Ser. No. 833,157, June 13, 1969. This application Jan. 24, 1972, Ser. No. 220,360
Claims priority, application Japan, July 15, 1968, 43/49,046
Int. Cl. C07f 9/08
U.S. Cl. 260—986      19 Claims

ABSTRACT OF THE DISCLOSURE

A process for the preparation of O,O-dimethyl-O-1,2-dibromo-2,2-dichloroethyl phosphate which comprises brominating O,O-dimethyl-O-dichlorovinyl phosphate in in the presence of an azo catalyst represented by the formula:

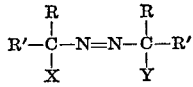

wherein R and R' each represents a member selected from the group consisting of an alkyl group of from 1 to 10 carbon atoms, a substituted alkyl group of from 1 to 10 carbon atoms, a monocyclic aryl group, a substituted monocyclic aryl group, an aralkyl group having from 7 to 12 carbon atoms, a substituted aralkyl group having from 7 to 12 carbon atoms, and a cycloalkyl group having from 3 to 8 carbon atoms in the ring; R and R' taken together with the carbon atom to which they are attached representing a cycloalkyl group having from 3 to 7 carbon atoms in the ring; and X and Y representing a member selected from the group consisting of an alkoxycarbonyl and a cyano group, said substituents of said substituted alkyl, monocyclic aryl, and aralkyl group being members selected from the group consisting of a halogen atom, a nitro group, an amino group, a lower alkyl amino group, a lower alkoxy group, a monocyclic aryloxy group, and a carboxy group, said process being carried out at a temperature of from 20°–150° C.

BACKGROUND OF THE INVENTION

1. Field of the invention

The present invention relates to an improved process for the production of an organic phosphorus compound, in particular, O,O-dimethyl-O-1,2-dibromo - 2,2 - dichloroethyl phosphate.

2. Description of the prior art

It is well known that the above mentioned compound is an excellent insecticide which, while possessing high insecticidal activity, is not harmful to mammals.

The compound of the present invention is commonly prepared by the bromination of O,O-dimethyl-O-dichlorovinyl phosphate (hereinafter referred to as DDVP). Previously, it has been proposed to carry out said bromination in any of several ways, such as a photochemical reaction (Japanese patent publication Nos. 65175/1962, 21512/64), a reaction in the presence of a peroxide compound (Japanese patent publication No. 25663/1963) or a reaction with 1,4-dioxane dibromide (Japanese patent publication No. 25037/1964).

Bromination by photochemical means proceeds slowly even when sufficient light is available, as in the case of using a flask or small reactor. If the quantity of reactant is increased, however, it is very difficult to provide sufficient light, which results in a lowering of the reaction velocity, a lengthening of the reaction time and the occurrence of abnormal reactions. In such a case, only a very low yield of objectionably impure products may be obtained. Furthermore, it iss necessary to precisely control the addition rate and reaction velocity of bromine over a long period of time, since abnormal reactions are caused due to the oxidizing strength of bromine if the content of free bromine in the reaction mixture becomes excessive. This method is therefore obviously unsuited to commercial practice.

Reaction with 1,4-dioxane dibromide is also disadvantageous not only in that dioxane is an expensive chemical, but also in that it has a tendency to crystallize, particularly in winter, and handling is difficult because of its combustibility.

Reaction in the presence of a peroxide is likewise not satisfactory from the standpoint of yield, although it can be practiced on a commercial scale.

SUMMARY OF THE INVENTION

Surprisingly, however, we have found that high purity, stable O,O-dimethyl-O-1,2-dibromo-dichloroethyl phosphate can be quantitatively produced by bromination of DDVP when the reaction is catalyzed by a small but effective smount of an azo compound represented by the following general formula:

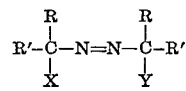

in which R and R' may be the same or different and represent alkyl and substituted alkyl having from 1 to 10 carbon atoms, aryl, preferably monocyclic aryl, aralkyl, preferably monocyclic aralkyl, having from 7 to 12 carbon atoms, or cycloalkyl having from 3 to 8 carbons in the ring; R and R', taken together with the carbon to which they are joined represent cycloalkyl having 3 to 7 carbons in the ring; and X and Y may be the same or different and represent alkoxycarbonyl or cyano.

The term "alkyl," as employed herein, includes both straight and branched chain radicals. The terms aryl and aralkyl are means to encompass radicals containing both substituted and unsubstituted aryl radicals. The terms "monocyclic aryl" and "monocyclic aralkyl" are meant to encompass radicals containing phenyl and substituted phenyl radicals.

Substituting groups which may be included in the above alkyl, aryl and aralkyl radicals may be, for example, halo, nitro, amino, lower alkylamino, lower alkoxy, monocyclic aryloxy and carboxy.

The terms "lower alkyl" and "lower alkoxy," as employed herein, include both straight and branched chain radicals of less than eight carbon atoms.

DETAILED DESCRIPTION OF THE INVENTION

Particularly preferred catalysts in accordance with the above formula are those in which at least one of R and R' represents alkyl and those in which R and R' are combined together with the carbon to which they are attached, to form a cycloalkyl radical.

Illustrative of the azo compounds which may be employed as catalysts in the present invention are 2,2'-azo-bis-(isobutyronitrile),
2,2'-azo-bis-(2-methylbutyronitrile),
2,2'-azo-bis-(2-methylvaleronitrile),
2,2'-azo-bis-(2,4-dimethylvaleronitrile),
2,2'-azo-bis-(2-methoxymethylpropionitrile), 2,2'-azo-bis-[2-(N,N-dimethylaminoethyl)-propionitrile],
2,2'-azo-bis-(2-carboxyethylpropionitrile),
2,2'-azo-bis-(2-phenylpropionitrile),
2,2'-azo-bis-(2-benzylpropionitrile);
2,2'-azo-bis-(2-p-chlorobenzylpropionitrile),
2,2'-azo-bis-(2-p-nitrobenzylpropionitrile),
2,2'-azo-bis-(2-cyclopropylpropionitrile),
2,2'-azo-bis-(2-cyclohexylpropionitrile),
1,1'-azo-bis-(1-cyclopentanenitrile),
1,1'-azo-bis-(1-cyclohexanenitrile),
2,2'-azo-bis-(isobutyrate methylester) and
2,2'-azo-bis-(isobutyrate ethyl ester), and the like. Mixtures of azo compounds may also be employed in the practice of the present invention.

The catalyst is employed in an amount sufficient to brominate DDVP. Generally, the azo compounds may be employed, for example, over a range of about 0.001 to 1.0% by weight, preferably about 0.01 to 0.3% by weight based upon the weight of DDVP, although the amount employed depends on the particular catalyst and other variations in reaction conditions, such as temperature, solvent employed and the like. The bromination may be accomplished by employing the reactants in approximately stoichiometric amounts. A small excess of bromine enhances the reaction, however, and is preferably employed.

The reaction may be carried out either in the presence or absence of a solvent, but the use of a solvent is preferred. Any organic solvent inert to the reaction system may be employed. Illustrative of such solvents are:

(i) Halogen substituted aliphatic solvents, such as carbon tetrachloride, chloroform, ethane tetrachloride.
(ii) Halogen substituted aromatic solvents, such as chlorobenzene bromobenzene, chlorobromobenzene.
(iii) Carboxylic acids and their ester solvents, such as acetic acid, ethyl acetate.
(iv) Ether solvents, such as ethyl ether and dioxane.
(v) Other solvents, such as carbon disulfide.

When effecting the reaction in a solvent system, for example, DDVP and catalyst in suitable amounts are added to the solvent and uniformly mixed, and bromine in a desired amount is gradually added to the resulting solvent-DDVP-catalyst system.

The reaction temperature must be suitably adjusted dependent upon the particular catalyst and solvent employed. In general, the temperature employed will be about 20 to 150° C., preferably about 40 to 100° C. Temperatures higher than 150° C. result in thermal cracking of DDVP as well as the product. That is, it appears that HBr is first liberated from the product, which then decomposes. Temperatures lower than about 20° C., on the other hand, result in unsatisfactory rates of reaction and reduced catalytic activity.

This reaction proceeds in a very short time as compared with prior art processes and is substantially completed when the addition of bromine is finished. Preferably, the reaction is to be completed within about 0.5-1 hour with stirring after the addition of bromine. The speed of the reaction is a particularly surprising feature of this invention.

This reaction may be carried out in the atmosphere, but it is preferable to cover the surface of the reaction system with an inert gas such as nitrogen, neon, argon or carbon dioxide so as to obtain a colorless, odor-free, crystalline product.

In accordance with the process of this invention, the reaction may be completed independently of the presence of light and unlike the known processes, in a very short time without abnormal reactions, which result in an offensive odor being imparted to the product, and results in a high purity product in high yield. This means that the product is much more stable than those of the prior art and is particularly suitable for use as an insecticide.

The following examples will illustrate the invention in more detail.

EXAMPLE 1

137 g. of DDVP (0.619 mol), 200 g. of carbon tetrachloride solvent and 41 mg. of 2,2'-azo-bis-(isobutyronitrile) (0.03% by weight of DDVP) were charged while stirring to a 500 mol flask equipped with a stirrer, cooler, thermometer and dropping funel surrounded by a light cut-off and dissolved. While maintaining the temperature at 50–60° C., 100 g. of bromine (0.625 mol) was added dropwise over a period of 30 minutes. The mixture was then stirred at the same temperature for 30–60 minutes to complete the reaction. The reaction mixture was then subjected to distillation under reduced pressure to recover the carbon tetrachloride and the slight excess of bromine, giving 234 g. of a substantially colorless product, O,O-dimethyl-O-1,2-dibromo-2,2-dichloroethyl phosphate (99.5% by weight yield).

The purity of the product was 99.1% by weight as analyzed by an infrared ray absorption spectrum method (quantitative method by the insecticide guide of the Welfare Ministry (Japan)).

Following the procedure of Example 1 but varying the catalyst concentrations, the following results were obtained:

| Example | Catalyst con. (percent by wt.) of DDVP used | Bromine dropping time (min.) | Purity product (percent) | Yield of product (percent by wt.) |
|---|---|---|---|---|
| 2 | 0.3 | 20 | 99.1 | 100 |
| 3 | 0.2 | 25 | 99.0 | 99.6 |
| 4 | 0.1 | 30 | 98.9 | 99.4 |
| 5 | 0.05 | 30 | 99.4 | 99.5 |
| 6 | 0.01 | 60 | 99.1 | 99.7 |

Using 0.1, 0.03 and 0.01% by weight of 2,2'-azo-bis-(isobutyronitrile) without cutting off light, the following similar results were obtained:

| Example | Catalyst con. (percent by wt.) of DDVP used | Bromine dropping time (min.) | Purity product (percent) | Yield of product (percent by wt.) |
|---|---|---|---|---|
| 7 | 0.1 | 30 | 99.2 | 100 |
| 8 | 0.03 | 30 | 99.1 | 99.5 |
| 9 | 0.01 | 60 | 98.8 | 99.0 |

Following the procedure of Example 1, except that 138 g. of DDVP and 0.05% by weight of various catalysts tabulated below (based on the weight of DDVP) are employed, the following results were obtained:

| Example | Catalyst[1] | Reaction temp. (° C.) | Bromine dropping time (min.) | Purity of product (percent) | Yield of prod. wt. percent |
|---|---|---|---|---|---|
| 10 | (1) | 50–55 | 25 | 98.9 | 99.1 |
| 11 | (2) | 60–65 | 60 | 98.8 | 99.4 |
| 12 | (3) | 50–55 | 40 | 98.9 | 99.2 |
| 13 | (4) | 70–75 | 40 | 97.5 | 99.0 |
| 14 | (5) | 70–75 | 40 | 97.8 | 99.0 |
| 15 | (6) | 75–77 | 60 | 97.0 | 99.3 |
| 16 | (7) | 75–77 | 60 | 97.2 | 99.4 |
| 17 | (8) | 70–75 | 60 | 97.8 | 100 |
| 18 | (9) | 70–75 | 60 | 98.2 | 99.5 |

[1] NOTE:
(1) 2,2'-azo-bis-(2-methylbutyronitrile).
(2) 1,1'-azo-bis-(1-cyclohexanenitrile).
(3) 2,2'-azo-bis-(2,4-dimethylvaleronitrile).
(4) 2,2'-azo-bis-(isobutyrate methyl ester).
(5) 2,2'-azo-bis-(isobutyrate ethyl ester).
(6) 2,2'-azo-bis-(2-phenylpropionitrile).
(7) 2,2'-azo-bis-(2-p-nitrophenylpropionitrile).
(8) 2,2'-azo-bis-(2-benzylpropionitrile).
(9) 2,2'-azo-bis-(2-cyclohexylpropionitrile).

138 g. of DDVP (0.619 mol), 200 g. of carbon tetrachloride solvent and 41 mg. of 2,2'-azo-bis-(isobutyronitrile) (0.03% by weight of DDVP) were charged while stirring to a 500 ml. flask equipped with a stirrer, cooler, thermometer, dropping funnel and nitrogen gas conduit, while nitrogen gas was introduced therein to provide a nitrogen atmosphere in the flask. During the reaction, nitrogen was fed at a rate of 5 ml. per minute. At a reaction temperature of 50–55° C., 100 g. of bromine (0.625 mol) was added dropwise over a period of 30 minutes. The mixture was then held at the same temperature for 30 minutes to complete the reaction. The reaction mixture was then subjected to distillation under reduced pressure to recover the carbon tetrachloride and slight excess of bromine giving 232 g. of a colorless, odor-free O,O-dimethyl-O-1,2-dibromo-2,2-dichloroethyl phosphate (98.5% yield). The purity of the product was 98.9%.

Following the procedure of Example 1, except that various solvents as tabulated below were used, the following results were obtained:

| Example | Solvent | Purity (percent) | Yield (percent by weight) |
|---|---|---|---|
| 19 | None | 98.9 | 100 |
| 20 | Dioxane | 98.7 | 99.8 |
| 21 | Chloroform | 99.3 | 100 |
| 22 | Carbon disulfide | 99.2 | 99.5 |
| 23 | Ethyl acetate | 96.2 | 100 |

What is claimed is:

1. A process for the preparation of O,O-dimethyl-O-1,2-dibromo-2,2-dichloroethyl phosphate which comprises brominating O,O-dimethyl-O-dichlorovinyl phosphate in the presence of an effective amount of an azo catalyst represented by the formula:

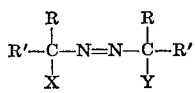

wherein R and R' each represents a member selected from the group consisting of an alkyl group of from 1 to 10 carbon atoms, a substituted alkyl group of from 1 to 10 carbon atoms, a monocyclic aryl group, a substituted monocyclic aryl group, an aralkyl group having from 7 to 12 carbon atoms, a substituted aralkyl group having from 7 to 12 carbon atoms, and a cycloalkyl group having from 3 to 8 carbon atoms in the ring; R and R' taken together with the carbon atom to which they are attached representing a cycloalkyl group having from 3 to 7 carbon atoms in the ring; and X and Y representing a member selected from the group consisting of a lower alkoxycarbonyl and a cyano group, said substituents of said substituted alkyl, monocyclic aryl, and aralkyl groups being members selected from the group consisting of a halogen atom, a nitro group, an amino group, a lower alkyl amino group, a lower alkoxy group, a monocyclic aryloxy group, and a carboxy group, said process being carried out at a temperature of from 20°–150° C.

2. A process as set forth in claim 1 wherein the amount of catalyst employed is from 0.001 to 1.0% by weight based upon the weight of O,O-dimethyl-O-dichlorovinyl phosphate.

3. A process as set forth in claim 2 wherein the bromination takes place in the presence of a solvent.

4. A process as set forth in claim 2 wherein the bromination takes place in the absence of a solvent.

5. A process as set forth in claim 3 wherein the solvent is selected from the group consisting of halogen substituted aliphatic and aromatic solvents.

6. A process as set forth in claim 5 wherein the solvent is selected from the group consisting of carbon tetrachloride, chloroform, ethane tetrachloride, chlorobenzene, bromobenzene and chlorobromobenzene.

7. A process as set forth in claim 3 wherein the solvent is selected from the group consisting of carboxylic acid and carboxylic acid ester solvents.

8. A process as set forth in claim 7 wherein the solvent is selected from the group consisting of acetic acid and ethyl acetate.

9. A process as set forth in claim 3 wherein the solvent is an ether.

10. A process as set forth in claim 9 wherein the ether is selected from the group consisting of ethylether and dioxane.

11. A process as set forth in claim 3 wherein the solvent is carbon disulfide.

12. A process as set forth in claim 2 wherein the catalyst is selected from the group consisting of
2,2'-azo-bis-(isobutyronitrile),
2,2'-azo-bis-(2-methylbutyronitrile),
2,2'-azo-bis-(2-methylvaleronitrile),
2,2'-azo-bis-(2,4-dimethylvaleronitrile),
2,2'-azo-bis-(2-methoxymethylpropionitrile),
2,2'-azo-bis-[2-(N,N-dimethylaminoethyl)-propionitrile],
2,2'-azo-bis-(2-carboxyethylpropionitrile),
2,2'-azo-bis-(2-phenylpropionitrile),
2,2'-azo-bis-(2-benzylpropionitrile),
2,2'-azo-bis-(2-p-chlorobenzylpropionitrile),
2,2'-azo-bis-(2-p-nitrobenzylpropionitrile),
2,2'-azo-bis-(2-cyclopropylpropionitrile),
2,2'-azo-bis-(2-cyclohexylpropionitrile),
1,1'-azo-bis-(1-cyclopentanenitrile),
1,1'-azo-bis-(1-cyclohexanenitrile),
2,2'-azo-bis-(isobutyrate methylester),
2,2'-azo-bis-(isobutyrate ethyl ester),
and mixtures thereof.

13. The process of claim 1, wherein said temperature ranges from 40°–100° C.

14. The process of claim 2, wherein said amount of catalyst employed ranges from 0.01 to 0.3 percent by weight based upon the weight of O,O-dimethyl - O - dichlorovinyl phosphate.

15. The process of claim 1, wherein the reaction time ranges from 0.5 to 1 hour.

16. A process for the preparation of O,O-dimethyl-O-1,2-dibromo-2,2-dichloroethyl phosphate which comprises brominating O,O-dimethyl-O-dichlorovinyl phosphate in the presence of an effective amount of an azo catalyst represented by the formula:

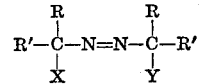

wherein R and R' each represent a member selected from the group consisting of an alkyl group of from 1 to 10 carbon atoms, a substituted alkyl group of from 1 to 10 carbon atoms, a monocyclic aryl group, a substituted monocyclic aryl group, an aralkyl group having from 7 to 12 carbon atoms, a substituted aralkyl group having from 7 to 12 carbon atoms, and a cycloalkyl group having from 3 to 8 carbon atoms in the ring; R and R' taken together with the carbon atom to which they are attached representing a cycloalkyl group having from 3 to 7 carbon atoms in the ring; and X and Y representing a member selected from the group consisting of a lower alkoxycarbonyl and a cyano group, said substituents of said substituted alkyl, monocyclic aryl, and aralkyl groups being members selected from the group consisting of a halogen atom, a nitro group, an amino group, a lower alkyl amino group, a lower alkoxy group, a monocyclic aryloxy group, and a carboxy group, said process being carried out at a temperature of from 40°–100° C., within a time period of from 0.5–1 hour, said process being carried out in the presence of a solvent selected from the group consisting of halogen substituted aliphatic and aromatic solvents, carboxylic acids and their ester solvents, ether solvents, and carbon disulfide, said catalyst being present in an amount of from 0.001 to 1.0 percent by weight, based upon the weight of O,O-dimethyl-O-dichlorovinyl phosphate.

17. The process of claim 16, wherein said catalyst is present in an amount from 0.01 to 0.3 percent by weight based upon the weight of O,O-dimethyl-O-dichlorovinyl phosphate.

18. The process of claim 1, wherein said azo catalyst is azo-bis(isobutylnitrile).

19. The process of claim 16, wherein said azo catalyst is azo-bis(isobutylnitrile).

References Cited
UNITED STATES PATENTS

| | | | |
|---|---|---|---|
| 3,068,270 | 12/1962 | McKenna | 260—986 |
| 3,449,474 | 6/1969 | Griesbaum et al. | 260—948 |

LEWIS GOTTS, Primary Examiner

R. L. RAYMOND, Assistant Examiner